United States Patent [19]

Takakusaki et al.

[11] Patent Number: 4,850,850

[45] Date of Patent: Jul. 25, 1989

[54] APPARATUS FOR PREPARING HEAT-SET PLASTIC HOLLOW VESSEL

[75] Inventors: Nobuyuki Takakusaki, Yokohama; Yohji Mizutani; Nobuhiro Kishida, both of Tokyo; Manabu Hosokawa, Kawasaki, all of Japan

[73] Assignee: Toyo Seikan Kaisha, Ltd., Japan

[21] Appl. No.: 153,289

[22] Filed: Feb. 4, 1988

Related U.S. Application Data

[63] Continuation-in-part of Ser. No. 82,466, Aug. 7, 1987, Pat. No. 4,790,741.

[51] Int. Cl.[4] ........................ B29C 49/36; B29C 49/58; B29C 49/64
[52] U.S. Cl. ................................. 425/526; 425/528; 425/529; 425/534; 425/535; 425/538; 425/540
[58] Field of Search ............... 425/526, 535, 536, 538, 425/539, 540, 522, 528, 529, 534, 535, 387.1

[56] References Cited

U.S. PATENT DOCUMENTS

| | | | |
|---|---|---|---|
| 3,599,280 | 1/1968 | Rosenkrane | 425/540 |
| 3,609,803 | 10/1971 | Fattori | 425/537 |
| 3,807,927 | 4/1974 | Schonewald | 425/535 |
| 3,819,317 | 6/1974 | Higginbotham | 425/535 |
| 3,872,203 | 3/1975 | Yoshikawa et al. | 425/526 |
| 3,984,513 | 10/1976 | Mulraney | 425/539 |
| 4,020,137 | 4/1977 | Lachner et al. | 425/533 |
| 4,036,925 | 7/1977 | Kauffman et al. | 425/540 |
| 4,050,876 | 9/1977 | Kauffman et al. | 425/540 |
| 4,214,860 | 7/1980 | Kleimenhagen et al. | 425/540 |
| 4,233,010 | 11/1980 | Suzuki | 425/540 |
| 4,299,549 | 11/1981 | Suzuki et al. | 425/540 |
| 4,355,968 | 10/1982 | Lagoutte et al. | 425/536 |
| 4,470,796 | 9/1984 | Stroup et al. | 425/526 |
| 4,479,772 | 10/1984 | Kleimenhagen | 425/539 |
| 4,726,756 | 2/1988 | Aoki | 425/526 |

FOREIGN PATENT DOCUMENTS

| | | | |
|---|---|---|---|
| 2059969 | 6/1972 | Fed. Rep. of Germany | 425/526 |
| 2339019 | 2/1975 | Fed. Rep. of Germany | 425/526 |

Primary Examiner—Willard Hoag
Attorney, Agent, or Firm—Sughrue, Mion, Zinn, Mapeack, and Seas

[57] ABSTRACT

An apparatus for preparing a drawn heat-set plastic hollow vessel, which comprises a rotary member having a plurality of openable-closable blow-forming and heat-setting molds and preform-supporting mechanisms corresponding to said molds, a preform supply mechanism for supplying a preform maintained at a drawing temperature into the mold of the rotary member at the opening position and a vessel withdrawal mechanism for withdrawing a drawn and heat-set vessel from the mold of the rotary member at the opening position, wherein the rotary member comprises a mold-heating mechanism for maintaining the molds at a heat-setting temperature through the entire rotation course of the rotary member, an opening and closing mechanism for closing the molds after passage through the position of the preform supply mechanism and opening the molds before arrival at the position of the vessel withdrawal mechanism, a sealing member capable of reciprocating relatively to the preform supported by the preform support mechanism while having a sealing engagement with the mouth portion of the preform, a hollow drawing rod arranged concentrically with the sealing member to reciprocate so that the drawing rod is inserted into the preform and drawn out therefrom.

3 Claims, 6 Drawing Sheets

APPARATUS FOR PREPARING HEAT-SET PLASTIC HOLLOW VESSEL

This application is a continuation-in-part application of the application Ser. No. 82,466 filed on Aug. 7, 1987 now U.S. Pat. No. 4,790,741.

BACKGROUND OF THE INVENTION

1. Field of the Invention

The present invention relates to an apparatus for preparing a heat-set plastic hollow vessel. More particularly, the present invention relates to an apparatus for preparing a heat-set plastic hollow vessel, which is biaxially molecularly oriented by drawing, in one mold at a high efficiency.

2. Description of the Related Art

A biaxially draw-blow-formed vessel of a thermoplastic polyester such as polyethylene terephthalate (PET) has a high transparency and an excellent surface gloss and also has high impact strength, rigidity and gas barrier property required for a bottle. Accordingly, vessels of this type are utilized for bottling various liquids.

However, polyester vessels are defective in that the heat resistance is poor, and when hot-filled, thermal deformation or change of the volume by shrinkage occurs. Accordingly, various proposals have been made for heat-setting a biaxially draw-blow-formed vessel after the forming operation.

The heat-setting method is roughly divided into a so-called one-mold method in which the draw-blow forming and heat-setting are carried out in one common mold and a so-called two-mold method in which the draw-blow forming and heat-setting are carried out in different molds.

According to the one-mold method, as disclosed in Japanese Patent Publication No. 6216/84, the draw-blow forming and heat setting are simultaneously carried out in a blow-forming mold, and a relatively long residence time in the mold is necessary for effecting the heat-setting after the draw-blowing operation and the cooling for the withdrawal of a formed hollow vessel and therefore, the manufacturing speed is still low. As the one-mold method, Japanese Patent Application Laid-Open Specification No. 95666/79 proposes a process in which the temperature of a hollow mold is maintained at a highest level within the range where a final hollow formed body can be withdrawn without deformation without any substantial cooling, for example, at 100° C., and high-temperature high-pressure air is blown in a polyester preform and simultaneously, the preform is biaxially drawn. According to this process, the temperature of the mold need not be elevated or dropped, but the heat-setting is effected by heat transferred from the high temperature gas and a relatively long time is necessary for completion of the heat-setting because of the presence of the heat transfer interface. Moreover, the attained resistance to thermal shrinkage is still insufficient.

As the two-mold method, a process in which a formed body obtained by the draw-blow forming is taken out from a blow-forming mold and is then held in a heat-setting mold to effect the heat-setting, as disclosed in Japanese Patent Publication No. 56606/85, and a process in which the draw-blow forming and the heat treatment are simultaneously carried out in a primary mold and the formed body is taken out from the primary mold and is blow-formed again in a secondary mold without cooling, as disclosed in Japanese Patent Application Laid-Open Specification No. 53326/86 are known.

However, the two-mold method is defective in that two molds are necessary for the forming and heat-setting operations, the apparatus cost is increased and the number of the manufacturing steps is increased. Therefore, further improvements are desired.

SUMMARY OF THE INVENTION

It is therefore a primary object of the present invention to provide an apparatus in which drawn and heat-set plastic vessels can be continuously prepared with a relatively short residence time in the mold according to the above-mentioned one-mold method.

Another object of the present invention is to provide an apparatus for preparing a heat-set plastic hollow vessel, in which the biaxial draw-blow forming of a preform, the heat-setting of a hollow formed body and the cooling for withdrawal of a product are effectively performed in a single mold according to a predetermined program, that is, without any time loss.

In accordance with the present invention, there is provided an apparatus for preparing a drawn heat-set plastic hollow vessel, which comprises a rotary member having a plurality of openable-closable blow-forming and heat-setting molds and preform-supporting mechanisms corresponding to said molds, a preform supply mechanism for supplying a preform maintained at a drawing temperature into the mold of the rotary member at the opening position and a vessel withdrawal mechanism for withdrawing a drawn and heat-set vessel from the mold of the rotary member at the opening position, wherein the rotary member comprises a mold-heating mechanism for maintaining the molds at a heat-setting temperature through the entire rotation course of the rotary member, an opening and closing mechanism for closing the molds after passage through the position of the preform supply mechanism and opening the molds before arrival at the position of the vessel withdrawal mechanism, a sealing member capable of reciprocating relatively to the preform supported by the preform support mechanism while having a sealing engagement with the mouth portion of the preform, a hollow drawing rod arranged concentrically with the sealing member to reciprocate so that the drawing rod is inserted into the preform and drawn out therefrom, a first gas path formed between the periphery of the drawing rod and the sealing member having the sealing engagement with the mouth portion of the preform and leading to the interior of the preform, a second gas path formed in the interior of the hollow drawing rod and leading to the interior of the preform through openings distributed in the length direction of the drawing rod, a high-pressure hot air supply mechanism and discharge mechanism connected to the first gas path through an opening-closing or changeover valve, a cold air supply mechanism connected to the second gas path through an opening-closing valve, and a mechanism for controlling the opening-closing or changeover valve, which connects the first gas pass to the high-pressure hot air supply mechanism synchronously with the insertion of the drawing rod into the preform to effect stretch drawing of the preform by the drawing rod and blow drawing of the preform by hot air and to confine hot air in the formed vessel for heat-setting the formed vessel and connects, after said heat setting, the first gas path to the hot air discharge mechanism and the second gas path to the cold air supply mechanism to effect the discharge of hot air and cooling of the vessel.

DETAILED DESCRIPTION OF THE INVENTION

In the apparatus of the present invention, the draw-blow forming of the preform preheated at a drawing temperature is carried out in an openable and closable mold radially attached to a rotary member by cooperation of a drawing rod inserted into the preform and a high-pressure blown fluid. However, according to the present invention, the draw-blow forming of the preform, the heat setting of the formed hollow vessel and the withdrawal of the heat-set hollow vessel from the mold are preformed as a series of operation without any loss time.

In the present invention, in order to perform this series of operations efficiently, a mold heated at a heat-setting temperature through the entire course of rotation of the mold is used and a high-temperature and high-pressure gas is used as the fluid for blow-drawing the preform. By the axial drawing of the preform by the drawing rod and the peripheral expansion drawing of the preform by blowing of the high-temperature high-pressure gas, there is obtained a hollow vessel in which the vessel wall is biaxially molecularly oriented. Subsequently to formation of this hollow vessel, the inner face of the formed vessel wall falls in contact with the high-temperature high-pressure gas pressed into the vessel while the outer face of the formed vessel wall falls in contact with the mold surface heated at the high temperature, whereby the oriented vessel wall is heat-set. At the terminal stage of this heat setting, the high-temperature high-pressure gas pressed in the vessel is released, and cold air is blown into the vessel again to effect the cooling for the withdrawal of the heat-set hollow vessel. Finally, the mold is opened and the biaxially molecularly oriented and heat-set hollow vessel is taken out from the mold without shrinkage or deformation.

According to the present invention, supply of the high-temperature high-pressure gas and the low-pressure cooling gas is controlled in the following manner. A first gas path leading to the interior of the preform is laid out between the periphery of the drawing rod and the mandrel sealing member engaged with the mouth portion of the preform, and a second gas path leading to the interior of the preform through openings distributed in the length direction of the drawing rod is arranged in the interior of the drawing rod. In the first gas path, a high-pressure hot air supply mechanism and a hot air discharge mechanism are arranged through an opening-closing valve or a changeover valve, and in the second gas path, a low-pressure cold air supply mechanism is arranged through an opening-closing valve. For the control of each opening-closing valve or changeover valve, at the start of the draw-blow forming, synchronously with insertion of the drawing rod into the preform, the first gas path is connected to the high-pressure hot air supply mechanism, and after termination of the heat-setting, the first gas path is connected to the hot air discharge mechanism and the second gas path is connected to the low-pressure cold air supply mechanism. More specifically, the high-temperature high-pressure gas is first blown into the preform and the draw-blow forming of the preform is performed at an extremely high speed, and furthermore, by continuing application of the high-temperature high-pressure gas to the formed hollow vessel, the heat-setting of the wall of the hollow vessel is advanced rapidly and efficiently. At the terminal stage of the heat-setting, by connecting the first gas path laid out between the periphery of the drawing rod and the sealing member to the hot air discharge mechanism, the high-temperature high-pressure gas confined in the vessel is effectively discharged, and cold air is uniformly blown to the entire inner face of the vessel through many openings distributed in the length direction of the drawing rod and the cooling for taking out the heat-set hollow vessel from the mold is easily accomplished in a short time.

Therefore, according to the present invention, drawn and heat-set plastic vessels can be continuously prepared with a relatively short residence time in the mold by the one-mold method.

The present invention will now be described in detail with reference to an embodiment illustrated in the accompanying drawings.

Figure 1:
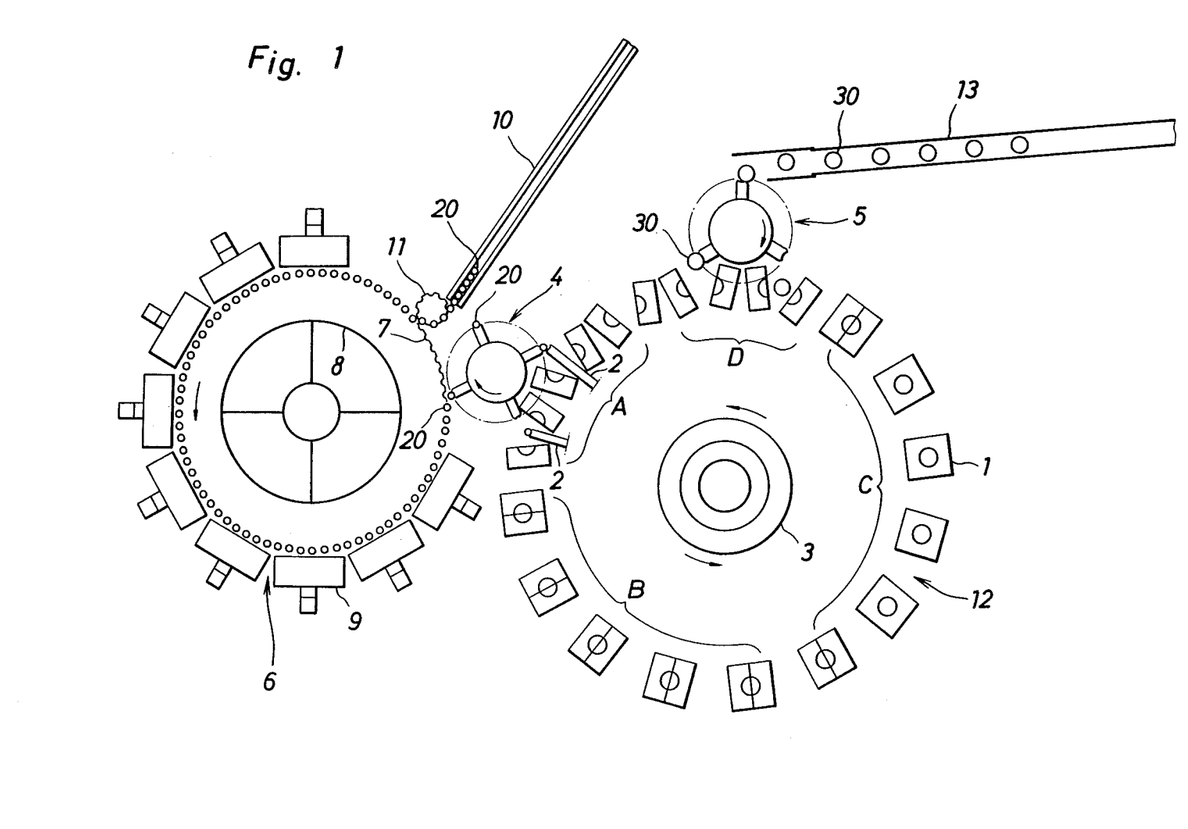
FIG. 1 is a top view illustrating the entire arrangement of the apparatus of the present invention.

Referring to FIG. 1, which is a top view illustrating the entire arrangement of the apparatus of the present invention, this apparatus comprises as main members a rotary member 3 having a plurality of openable-closable blow-forming and heat-setting molds 1 and corresponding preform-supporting mechanisms 2, a preform supply mechanism 4 for supplying a preform 20 maintained at a drawing temperature into the mold of the rotary member at the opening position and a vessel withdrawal mechanism 30 for withdrawing a drawn and heat-set vessel 30 from the mold of the rotary member at the closing position.

In the apparatus of the present invention, there is generally disposed a heating mechanism for preheating the preform 20 at the drawing temperature, and this heating mechanism comprises a rotary turret 8 having preform-supporting seats 7 on the periphery thereof and an infrared heater 9 arranged along the periphery of the turret. As is well-known, each supporting seat 7 allows the supported preform to turn on its own axis and to revolve around the axis of the turret with the movement thereof.

A supply chute 10 and a supply small turret 11 are arranged to supply preforms to the supporting seats of the heating mechanism 6, and by these members, a preform 20 formed in a separate injection-molding station is supplied to the heating mechanism 6.

The preform supply mechanism 4 receives the preform 20 heated at a predetermined temperature by the preheating mechanism and delivers the preform to the preform-supporting mechanism 2 at the position A where the mold is in the opened state. A known mechanism, for example, the mechanism disclosed in Japanese Patent Publication No. 33287/84, can be used as the preform supply mechanism 4, and therefore, explanation of this mechanism is omitted.

The draw-forming and heat-setting mechanism 12 used in the present invention has a mold-opening region and a mold-closing region. In the mold-opening region, there are disposed a vessel withdrawal zone D and a preform supply zone A and in the mold-closing region, there are disposed a draw-forming and heat-setting zone B and a cooling zone C.

A formed and heat-set form 30 is taken out from the mold by the withdrawal mechanism 5 and delivered to a subsequent zone by a discharge chute 13.

Figure 2:
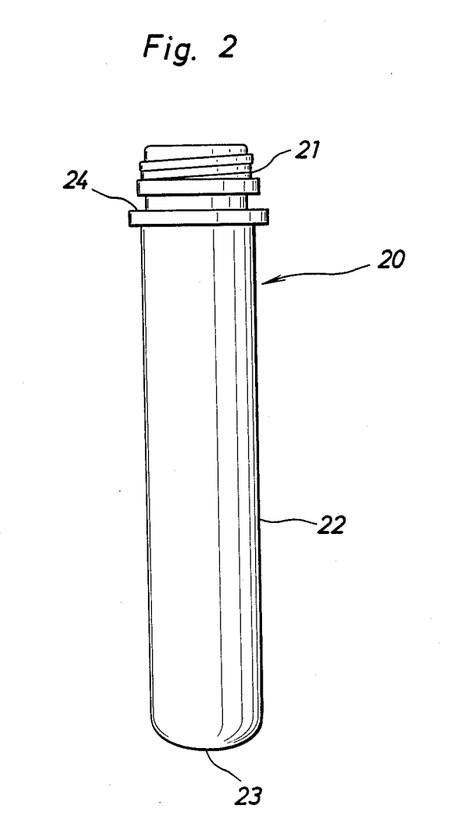
FIG. 2 is a side view illustrating the preform.

Referring to FIG. 2 illustrating the preform 20, this preform 20 comprises a cylindrical mouth-neck portion 21 having a size and shape corresponding to those of the mouth-neck portion of the final vessel, a cylindrical barrel 22, a closed bottom 23 and a support ring 24 which is formed just below the mouth-neck portion 21.

Figure 3:
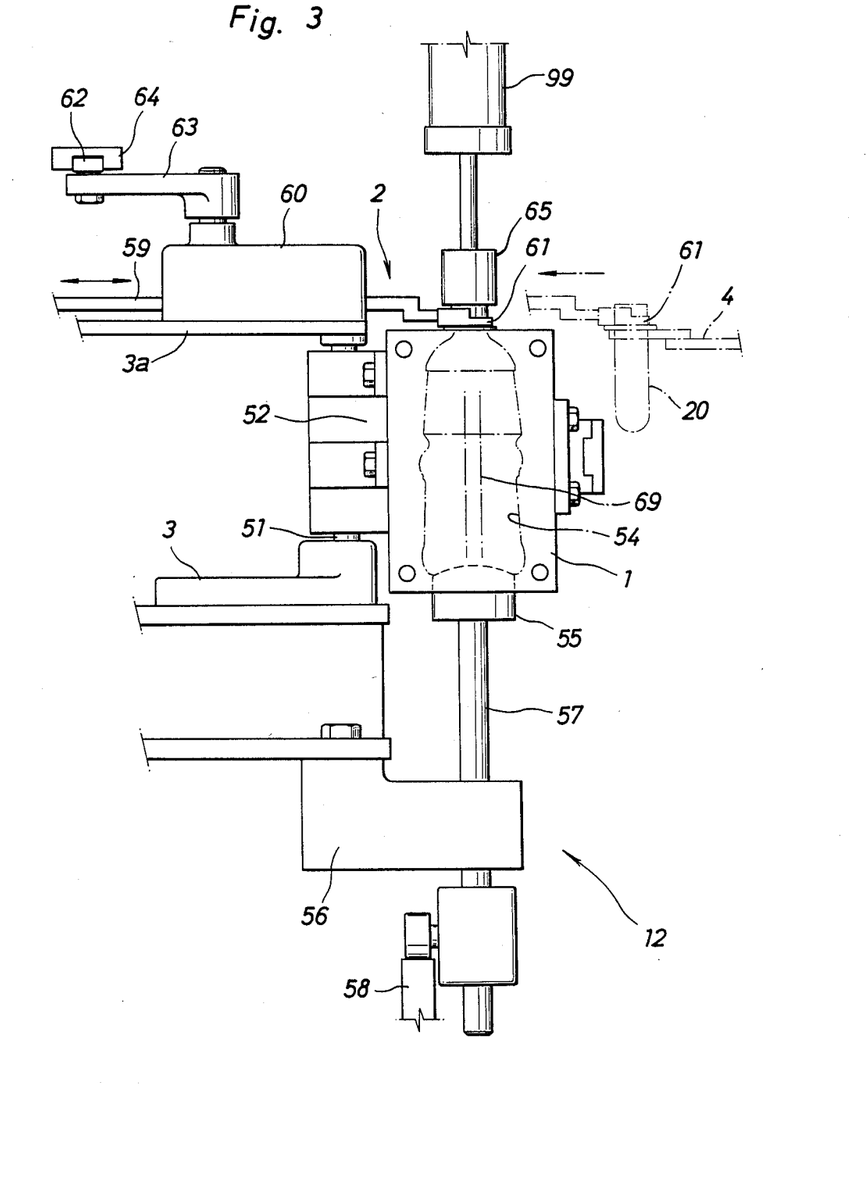
FIG. 3 is an enlarged sectional side view illustrating the drawing, forming and heat-setting mechanism.

Referring to FIG. 3 illustrating in detail the forming and heat-setting mechanism, a rotary member 3, 3a has a vertical shaft 51. A mold opening and closing arm 52 is arranged so that the arm 52 can swing in the horizontal direction with the vertical shaft 51 being as the center. The split mold 1 is attached to one end of the mold-opening and mold-closing arm 52, and a fluid pressure cylinder 53 (see FIG. 5) is arranged on the other end of the arm 52 to open and close the split mold 1. A cavity 54 having a size and shape corresponding to those of the final vessel is formed in the mold 1.

The upper portion of the mold 1 corresponding to the neck portion is opened and also the portion corresponding to a bottom mold 55 is opened.

A bracket 56 is attached to the lower portion of the rotary member 3, and a bottom mold-supporting shaft 57 is vertically movably supported by the bracket 56. The bottom mold 55 is supported on the top end of the shaft 57 and the lower end of the shaft 57 is connected to a bottom mold-lifting cylinder 58.

The preform-supporting mechanism 2 is arranged above the upper rotary member 3a. The mechanism 2 comprises a sliding shaft 59 extending in the radial direction and provided with a rack (not shown), shaft-supporting mechanism 60 supporting the sliding shaft 59 and having a pinion (not shown) engaged with the above-mentioned rack, a gripping part 61 arranged at the outer end in the radial direction of the shaft 59, an arm 63 connected to the pinion and having a cam follower 62 on one end and a cam groove 64 for regulating the position of the cam follower 62.

At the preform-supplying position, as indicated by the one-dot chain line in FIG. 3, the mouth portion of the preform 20 is gripped below the supporting ring in the upright state, and the preform-supporting mechanism 2 is combined with cam mechanisms 62 and 64 so that the shaft 59 moves outwardly with respect to the radial direction to grip the mouth-neck portion of the preform 20, the preform 20 thus gripped is then moved to the center of the split mold 1 and the preform 20 is held at this central position.

The sealing member 65 is arranged above the split mold 1 so that the sealing member 65 can be vertically moved by a lift mechanism 99.

Figure 4:
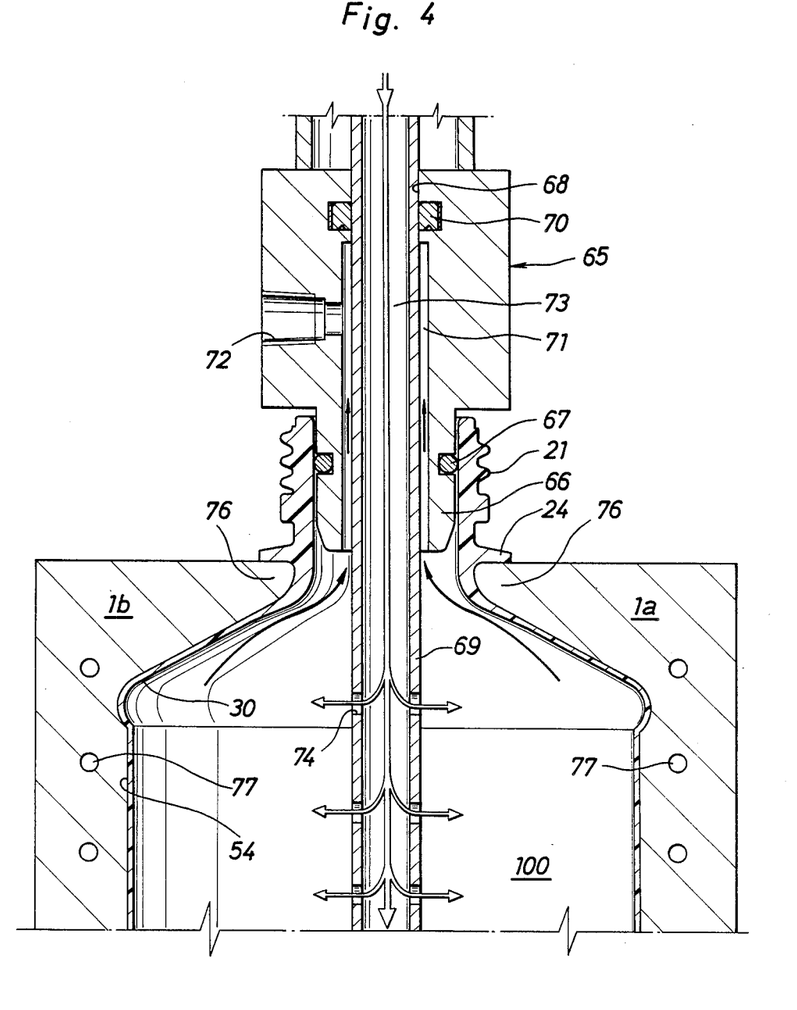
FIG. 4 is an enlarged sectional view illustrating the sectional structure of the drawing rod relatively to the sealing member.

Referring to FIG. 4 illustrating in detail the structure of the sealing member 65 relatively to the split mold, the sealing member 65 has on the lower end a top end portion 66 to be inserted into the mouth-neck portion of the preform 20, and an O-ring 67 is arranged on the outer periphery of the sealing member 65 to maintain good sealing between the inner circumference of the mouth-neck portion of the preform and the sealing member. A hollow path 68 is laid out in the direction of the central axis of the sealing member, and a drawing rod 69 extends through this path. The upper portion of the path 68 has exactly the same size as that of the periphery of the drawing rod 69 and good sealing is maintained between them through a seal 70. In the portion below this seal 70, an annular space acting as the first gas path (passageway) 71 is formed between the drawing rod 69 and the sealing member 65. On the periphery of the sealing member 65, there are formed this gas path 71 and a connector 72 for connecting the path 71 to the hot air supply mechanism or hot air discharge mechanism.

The drawing rod 69 is vertically movably arranged so that the drawing rod 69 is inserted into the preform and drawn out therefrom through the sealing member 65, and the drawing rod 69 has a hollow structure to form a second gas path 73 therein. This second gas path (passageway) 73 leads to the interior of the preform through openings 74 distributed in the length direction of the drawing rod 69. The vertical movement of the drawing rod 69 is accomplished by a fluid cylinder 75 (see FIG. 5).

In the state where the split mold 1 is closed, the central axis of the cavity 54 of the mold 1, the center of the bottom mold 55, the center of the preform 20, the center of the sealing member 65 for the blow-forming and the central axis of the drawing rod 69 are aligned and located on one vertical axis.

In the apparatus of the present invention, supporting of the preform 20 and the formed vessel 30 being heat-set is assuredly accomplished by exact engagement of an inwardly tapered portion 76 above the split mold 1a, 1b with the lower portion of the preform-or vessel-supporting ring 24.

In the apparatus of the present invention, the surface of the cavity 54 of the mold 1a, 1b is heated through the entire course of rotation of the mold by an electric heater mechanism 77 arranged in the mold 1a, 1b so that the surface of the cavity 54 is maintained at the heat-setting temperature.

Figure 5:
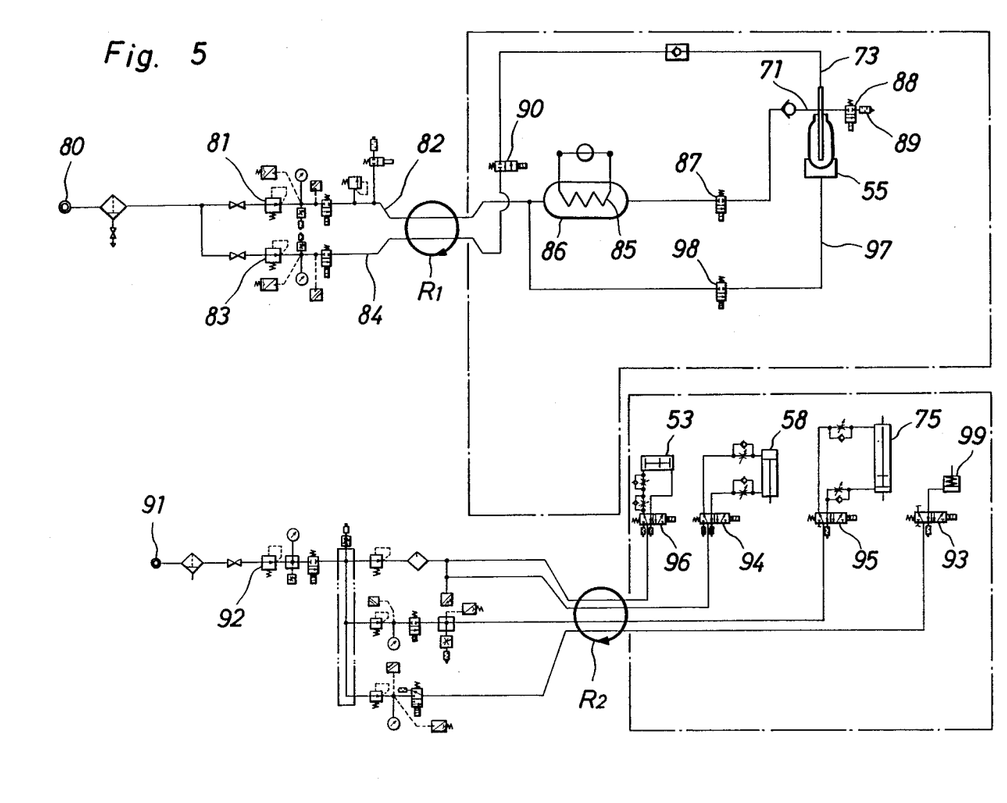
FIG. 5 is a systematic diagram illustrating the control mechanism for the draw-blow forming and heat-setting mechanism.

In FIG. 5 illustrating the control mechanism of the blow-forming and heat-setting mechanism 12, symbol R represents a rotary joint. Referring to FIG. 5, a high-pressure air source 80 (the maximum pressure is, for example, 40 kg/cm$^2$) is divided into a relatively high-pressure blowing air source 82 through a pressure-reducing valve 81 and a relatively low-pressure cooling air source 84 through a pressure-reducing valve 83. The high-pressure blowing air source 82 is connected to a rapidly heating tank 86 provided with an electric heater mechanism 85. The rapidly heating tank 86 is connected to the first gas path 71 through a main blowing electro magnetic valve 89. The first gas path 71 is connected to an exhaust opening 89 through a gas-discharging electromagnetic valve 88.

The low-pressure cooling air source 84 is connected to the second gas path 73 through a vessel-cooling electromagnetic valve 90.

Separately from the high-pressure air source, a low-pressure air source 91 for driving the respective fluid cylinders is disposed and connected to the respective cylinders through a pressure-adjusting valve 92 and the rotary joint R. More specifically, the low-pressure air source 91 is connected to a lift cylinder 99 for the blow-forming sealing member through an electromagnetic valve 93 for sealing the sealing member, to a lift cylinder 75 for the drawing rod through an electromagnetic valve 95 for the drawing and to a lift cylinder 58 for the bottom mold through an electromagnetic valve 94 for the bottom mold.

A cylinder 53 for opening and closing the mold is connected to the cylinder-driving low-pressure air source 91 through an opening and closing electromagnetic valve 96.

In order to facilitate the parting of the heat-set vessel from the bottom mold 55, an air-blowing pipe 97 is arranged in the bottom mold 55, and this pipe 97 is connected to the high-pressure blowing air source 82 through an electromagnetic valve 98 for parting the vessel from the mold.

In the apparatus of the present invention, the blow-forming and heat-setting are performed through the following operations.

(1) Supply

At the station A shown in FIG. 1, the mold 1 is opened, the bottom mold 55 is located at the lift position, and the blow-forming sealing mechanism 65 is located at the lift position. The preform 20 preheated at the drawing temperature is supplied to the preform supply mechanism 4 in the upright state where the mouth-neck portion 21 is located above. The preform 20 is gripped by the gripping portion of the preform-supporting mechanism 2, and then, the cam mechanisms 62 and 64 are moved and the sliding shaft 59 is moved inwardly in the radial direction. Thus, the preform 20 is moved to the center of the opened mold and stopped at this position.

(2) Preparation for Forming Operation

The mold opening and closing electromagnetic valve 96 is changed over and the cylinder 53 for opening and closing the mold begins the closing stroke to close the mold 1. Then, the electromagnetic valve 93 for sealing the sealing member is changed over and the lift cylinder 99 brings down the flow-forming sealing member 65 to keep the sealing state of the mouth portion of the preform 20.

(3) Blow-Forming and Heat-Setting

At the station B shown in FIG. 1, the drawing electromagnetic valve 95 is turned on, and the cylinder 75 makes the dropping movement and the drawing rod 69 drops. Thus, the preform 20 is drawn in the axial direction. Simultaneously, the main blowing electromagnetic valve 87 is changed over and high-temperature high-pressure air is blown into the preform through the first path 71 to expand and draw the preform in the circumferential direction.

The mold 1 is heated at the heat-setting temperature, and the biaxially molecularly oriented vessel wall falls in contact with the cavity surface of the mold 1 to effect the heat-setting. Application of high-temperature high-pressure air into the vessel 30 through the first path 71 is continued and the heat setting of the vessel 30 is promptly accomplished also by contact with this air.

(4) Cooling

At the station C shown in FIG. 1, the draw-blow-formed vessel 30 which has been heat-set in the mold 1 for a predetermined time is cooled for the withdrawal from the mold. At first, the blowing electromagnetic valve 87 is changed over to shut the passage and the air-discharging electromagnetic valve 89 is opened, and the vessel-cooling electromagnetic valve 90 is opened. Accordingly, as shown in FIG. 4, relatively low-pressure cooling air is blown to the molecularly oriented and heat-set vessel through the second gas path 73 within the drawing rod 69 and the openings 74 formed in the drawing rod 69. High-temperature air confined in the space 100 in the vessel and cooling air blown to the vessel wall are promptly discharged to the outside through the first gas path 71 around the drawing rod and the exhaust opening 89.

(5) Withdrawal

The vessel which has been cooled to such an extent that deformation of the vessel wall is prevented is finally taken out from the mold at the station P shown in FIG. 1. More specifically, at first, the vessel-cooling electromagnetic valve 90 is closed, and then, the sealing member-sealing electromagnetic valve 93 is changed over. The sealing member 65 for the blow forming is returned to the lift position by a spring (not shown). Then, the mold opening and closing electromagnetic valve 96 and the drawing electromagnetic valve 95 are changed over and the cylinder 53 is actuated to open the mold. Simultaneously, the cylinder 75 is actuated to raise the drawing rod 69 and stop the drawing rod 69 at a certain position. Incidentally, it is preferred that cooling of the interior of the vessel, described in (4) above, be conducted at least to the point of the opening of the mold. Then, the gas-discharging electromagnetic valve 88 is closed.

The electromagnetic valve 94 for the bottom mold is changed over and the cylinder 58 makes the dropping movement to drop the bottom mold 55. Simultaneously, the electromagnetic valve 98 for parting the vessel from the mold is changed over, and high-pressure air is blown to the bottom of the vessel and the parting of the vessel from the mold can be performed very smoothly.

At the withdrawal zone D shown in FIG. 1, the drawn and heat-set vessel 30 is moved to the outside of the mold as the sliding shaft 59 of the preform-supporting mechanism 2 is moved outwardly in the radial direction, and the vessel 30 is discharged onto the discharge chute 13 by the known vessel withdrawal mechanism.

Figure 6:
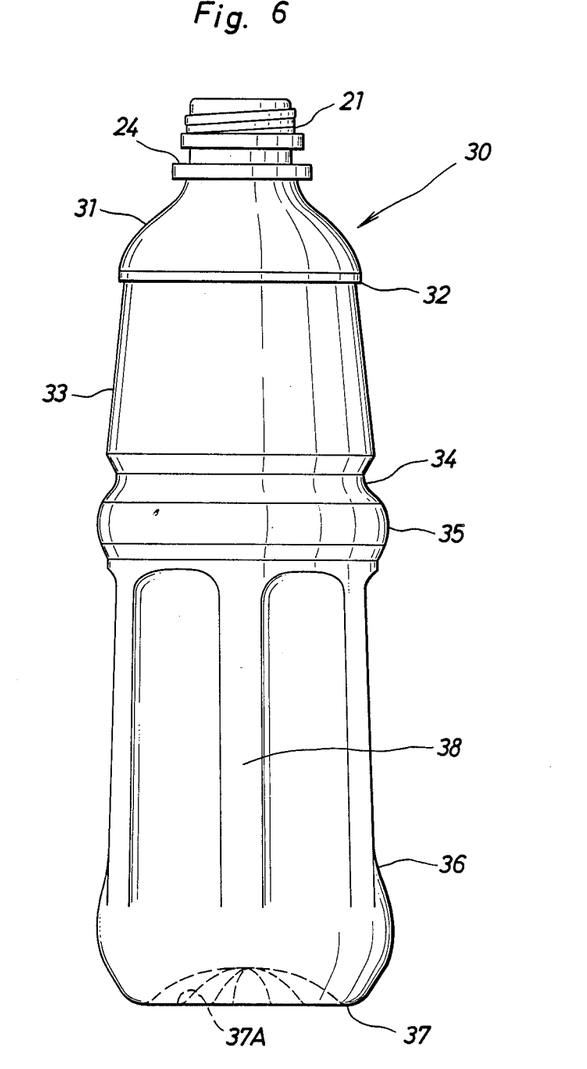
FIG. 6 is a front view illustrating an example of the vessel prepared by the apparatus of the present invention.

Referring to FIG. 6 illustrating an example of the drawn and heat-set hollow vessel prepared by the apparatus of the present invention, this vessel 30 is a PET bottle suitable for hot-filling of a drink such as fruit juice, vegetable juice or tea, and the vessel 30 comprises a screwed mouth-neck portion 21, a support ring 24, a conical shoulder 31, an upper barrel part 33 connected to the shoulder 31 through a circumferential stepped portion 32, a lower barrel part 36 connected to the upper barrel part 33 through a circumferential concave portion 34 and a circumferential convex portion 35, and a bottom 37. A plurality of convexities 38 having a relatively large diameter and a short circumferential length and extending in the direction of the height and a plurality of panel-like convexities 39 having a relatively small diameter and a long circumferential length are arranged alternately in the circumferential direction at the lower barrel part 36.

The panel-like convexities 39 exert a function of moderating the change of the inner pressure by outward expansion on the increase of the inner pressure or inward shrinkage on the decrease of the inner pressure. The circumferential concave portion 34 and circumferential convex portion 35 exert a function of allowing a certain deformation in the axial direction of the vessel. An inwardly concave, star-shaped portion 37A is formed at the center of the bottom 37 to prevent outward buckling by the pressure or thermal deformation.

According to the present invention, the respective portions of the vessel are effectively heat-set, and at the hot-filling step, thermal deformation is effectively prevented at the respective parts of the vessel. Accordingly, the functions of the respective portions of the vessel are effectively exerted and maintained at the hot-filling step and subsequent cooling step and even after the lapse of time, and irregular deformation of the vessel, which degrades the appearance characteristics of the vessel, can be prevented.

The apparatus of the present invention can be used for the production of various drawn heat-set plastic vessels, and the apparatus of the present invention is advantageously applied to the production of a drawn heat-set plastic vessel composed of a thermoplastic polyester.

In the present invention, as the thermoplastic polyester, there are used thermoplastic polyesters composed mainly of ethylene terephthalate units, such as PET and so-called modified PET formed by incorporating as the glycol component a small amount of other glycol such as hexahydroxylylene glycol or as the dibasic acid component a small amount of other dibasic acid such as isophthalic acid or hexahydrophthalic acid. The thermoplastic polyester may be used singly or in the form of a blend with other resin such as a nylon, a polycarbonate or a polyacrylate.

It is preferred that the inherent viscosity of the thermoplastic polyester used be at least 0.67 dl/g and the diethylene glycol unit content be lower than 2.0% by weight.

The bottom preform used for the draw-blow forming is prepared according to a known method such as injection molding or pipe extrusion molding. According to the former method, a molten polyester is injected and a bottomed preform having a mouth-neck portion, which corresponds to that of the final vessel, is prepared in the amorphous state. The latter method is advantageous for preparing a bottomed preform comprising a gas barrier intermediate resin layer composed of, for example, an ethylene/vinyl alcohol copolymer. According to this method, an extruded amorphous pipe is cut, a mouth-neck portion is formed on one end of the cut pipe, and the other end is closed to form a bottomed preform. In each method in order to maintain a good engaging and sealing state with a lid at a high temperature, only the portion to be formed into the mouth-neck portion of the vessel may be heat-crystallized in advance. Of course, this heat recrystallization can be carried out at an optional subsequent stage.

The preheating temperature for the preform is a so-called drawing temperature, and in case of PET, this temperature is in the range of from 80° to 120° C., especially from 90° to 110° C. The apparatus of the present invention is advantageously applied to the high-speed draw-forming and heat-setting of the preform, and in case of the high-speed draw-forming and heat-setting, the draw ratio of the inner face of the preform is not so high as the draw ratio of the outer face of the preform. Accordingly, it is preferred that the temperature of the inner face of the preform is not much lower than the temperature of the outer face and that the difference between the temperatures of the inner and outer faces of the preform be less than 10° C., especially less than 5° C.

In the present invention, the temperature of the mold is set at a level at which the heat-setting of the biaxially drawn vessel can be effectively accomplished. This temperature depends greatly on the degree of the heat resistance required for the vessel, but it is preferred that the mold temperature be at a highest level within the temperature range where the vessel can be taken out from the mold without any deformation with a relatively short cooling time. Namely, it is preferred that the mold temperature be 100° to 180° C., especially 120° to 150° C.

Air heated at temperature higher than the temperature of the preform is used as high-temperature high-pressure blowing air. In view of the efficiency of the high-speed drawing and heat setting, air heated at 100° to 150° C., especially 110° to 140° C., is advantageously used. In view of the efficiency of the high-speed drawing and heat-setting, it is preferred that the pressure be adjusted to 10 to 50 $kg/cm^2$ (gauge), especially 25 to 30 $kg/cm^2$ (gauge). Air at room temperature is supplied under a pressure to 10 to 30 $kg/cm^2$ (gauge), especially 15 to 25 $kg/cm^2$ (gauge), as cooling air.

It is preferred that the draw ratio in the axial direction to 1.2 to 3.0, especially 1.5 to 2.5, and the draw ratio in the circumferential direction be 2 to 5, especially 2.5 to 4.5.

When the apparatus of the present invention is used, a biaxially drawn and heat-set hollow vessel can be prepared by using a single mold with a relatively short residence time in the mold. The time for the draw-blow forming in the mold is ordinarily 0.5 to 3 seconds and especially 1 to 2 seconds. The heat-setting time is ordinarily 3 to 15 seconds and especially 4 to 8 seconds. The cooling time is ordinarily 3 to 15 seconds and especially 4 to 8 seconds.

In order to effectively utilize the internal friction of the preform for heat setting, it is preferred that the drawing speed in the axial direction be a draw ratio of at least 2.5, especially at least 3.0, per second, and the drawing speed in the circumferential direction be a draw ratio of at least 4.5, especially at least 5.0, per second.

According to the apparatus of the present invention, a biaxially drawn and heat-set vessel can be efficiently prepared by the one-mold method with a short residence time in the mold.

Furthermore, since the temperature of the preform is relatively high and hot air heated at a temperature higher than the temperature of the preform is blown under pressure into the preform, the high-speed draw-blowing becomes possible, and spontaneous heat generation considered to be due to the internal friction and crystallization of the polyester is caused by this high-speed draw-blowing. Accordingly, the temperature of the preform being draw-blow-formed is further elevated and moderation of the strain and crystallization are promoted, with the result that the heat-setting can be efficiently accomplished in a short time.

The highest temperature at which the draw-blow-formed and heat-set vessel can be withdrawn without any substantial deformation in the one-mold method tends to rise as the heat-setting temperature rises. In the apparatus of the present invention, the heat-setting is carried out at a relatively high temperature, as pointed out above, and the changeover of the heat-setting operation to the cooling operation can be accomplished very promptly without any loss time. Therefore, the time required for cooling the heat-set vessel is advantageously shortened according to the present invention.

We claim:

1. An apparatus for preparing a drawn heat-set plastic hollow vessel, which comprises:

a rotary member having a plurality of openable-closable blow-forming and heat-setting molds and preform-supporting mechanisms corresponding to said molds, a preform supply mechanism for supplying a preform maintained at a drawing temperature into the mold of the rotary member at the opening position, and a vessel withdrawal mechanism for withdrawing a drawn and heat-set vessel from the mold of the rotary member at the opening position, an opening and closing mechanism for closing the molds after passage through the position of the preform supply mechanism and opening the molds before arrival at the position of the vessel withdrawal mechanism, a sealing member capable of reciprocating relatively to the preform supported by the preform supporting mechanism while having a sealing engagement with the mouth portion of the preform, and a hollow drawing rod arranged concentrically with the sealing member to reciprocate so that the drawing rod is inserted into the preform and drawn out therefrom, wherein the rotary member comprises a mold-heating mechanism for maintaining the molds at a heat-setting temperature through the entire rotation course of the rotary member and wherein the apparatus additionally comprises a first gas passage formed between the periphery of the drawing rod and the sealing member having a sealing engagement with the mouth portion of the preform and leading to the interior of the preform, a second gas passage formed in the interior of the hollow drawing rod and leading to the interior of the preform through openings distributed in the length direction of the drawing rod, a high-pressure hot air supply mechanism and discharge mechanism connected to the first gas passage through an opening-closing or changeover valve, a cold air supply mechanism connected to the second gas passage through an opening-closing valve, and a mechanism for controlling the opening-closing or changeover valve, which connects the first gas passage to the high-pressure hot air supply mechanism synchronously with the insertion of the drawing rod into the preform to effect stretch drawing of the preform by the drawing rod and blow drawing of the preform by hot air and to confine hot air in the formed vessel for heat-setting the formed vessel and connects, after said heat setting, the first gas passage to the hot air discharge mechanism and the second gas passage to the cold air supply mechanism to effect the discharge of hot air and cooling of the vessel.

2. The apparatus of claim 1, wherein said preform supply mechanism comprises a supply chute and a supply small turret.

3. The apparatus of claim 1, wherein said withdrawal mechanisms comprises a discharge chute.

* * * * *